3,027,167
OIL SEAL
Joseph M. Liebig, Wheaton, Ill., assignor to Illinois Milling, Inc., Chicago, Ill., a corporation of Illinois
Filed May 1, 1959, Ser. No. 810,498
5 Claims. (Cl. 277—171)

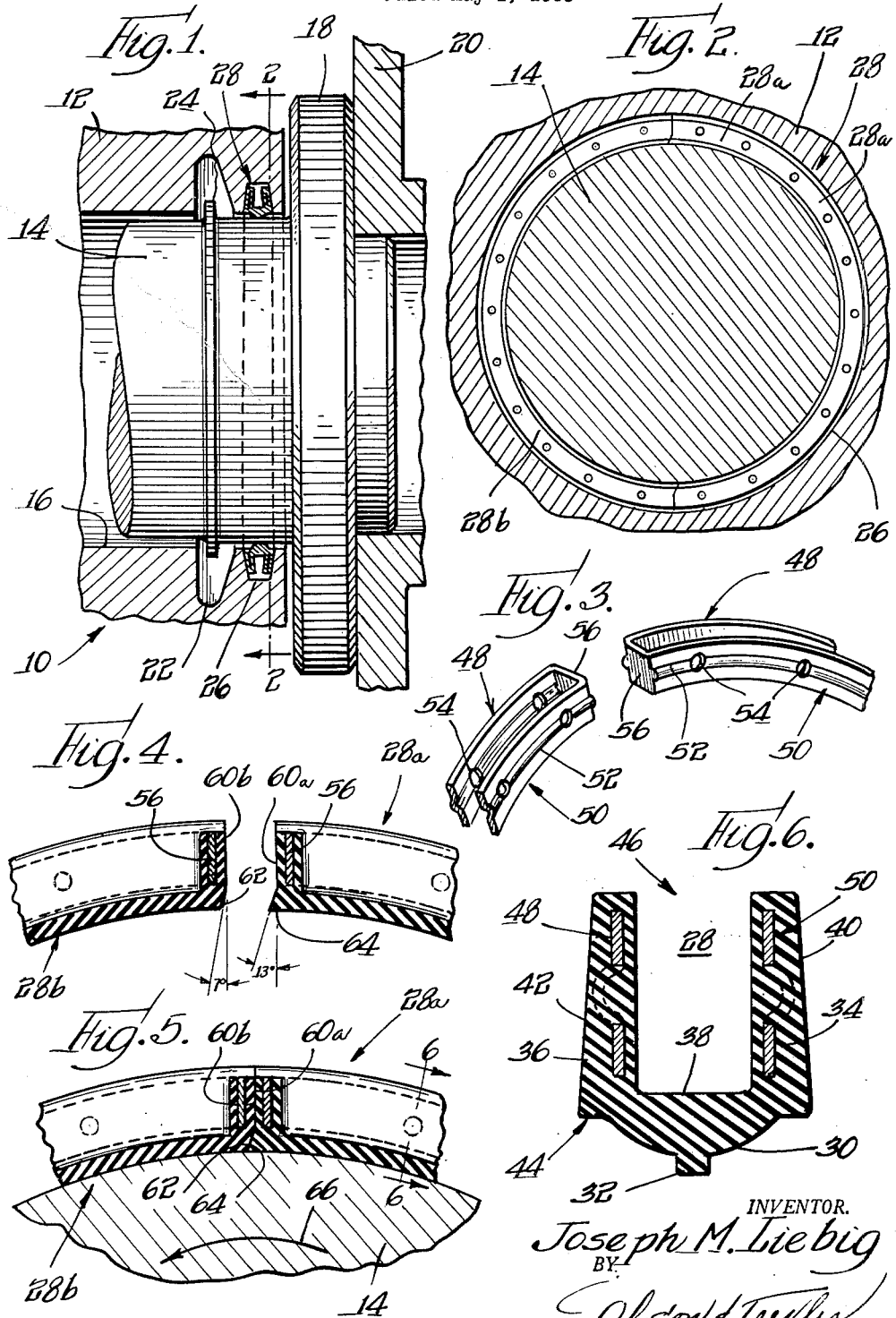
March 27, 1962     J. M. LIEBIG     3,027,167
OIL SEAL
Filed May 1, 1959
INVENTOR.
Joseph M. Liebig United States Patent Office 3,027,167
Patented Mar. 27, 1962

This invention relates to oil seals for use with rotating shafts.

When splash methods of lubrication are employed, there is some tendency for lubricant to leak out of the system around any rotating shafts extending therefrom. This leakage problem has been heightened by the advent of more modern pressurized methods of lubrication. In certain instances, as for example in conjunction with the oil seals used near the rear main bearing of automotive engines, severe limitations are placed on the permissible means of retaining the lubricant. In the exemplified situation, it is impossible to assemble conventional garter spring-type oil seals around the crankshaft in the vicinity of the rear main bearing.

Heretofore, seals have been effectuated in the vicinity of these rear main bearings by means of oil-impregnated hemp packed into a groove formed in the engine block encompassing the crankshaft. Seals so produced have not been uniformly successful in retaining the lubricant and further have demonstrated a tendency to generate considerable friction heat. This heat can be transmitted to the rear main bearing predisposing the same to failure.

Accordingly, an important object of the invention is to provide an improved oil seal for use with rotating shafts.

Another object of the invention is to provide an oil seal which bears lightly and uniformly on the encompassed shaft and which thereby minimizes friction-caused heating.

Yet another object of the invention is to provide an improved oil seal which is particularly useful with automotive crankshafts in the vicinity of the rear main bearing.

A further object of the invention is to provide a segmented shaft seal which, in use, automatically establishes a liquid-tight seal between the segments.

A still further object of the invention is to provide a shaft seal which can be manufactured to close dimensional tolerances and which maintains its size and shape in use.

A yet further object of the invention is to provide an oil seal arrangement which allows free radial flexure of the sealing rib.

Additional objects and features of the invention pertain to the particular structure and arrangements whereby the above objects are attained.

The invention, both to its structure and mode of operation, will be better understood by reference to the following disclosure and drawings forming a part thereof, wherein:

FIG. 1 is a central, sectional view of an automotive crankshaft arrangement incorporating an oil seal in accordance with the invention;

FIG. 2 is a view through the section 2—2 of FIG. 1;

FIG. 3 is a fragmentary, perspective view of terminal portions of reinforcing elements which may be used in the oil seal of the invention;

FIG. 4 is a side elevational view in cross-section of adjoining segments of an oil seal in accordance with the invention, showing the segments spaced apart;

FIG. 5 is a side elevational view in cross-section, showing the segments of FIG. 4 spaced together as in use; and FIG. 6 is an enlarged view through the section 6—6 of FIG. 5.

Referring now in detail to the drawings, specifically to FIGS. 1 and 2, there will be seen an automotive crankshaft arrangement 10 which includes an engine block 12 and a crankshaft 14. The crankshaft 14 extends rotatably through a horizontal bore 16 which has been machined in the block 12. In addition, crankshaft 14 is provided with a circular flange 18 formed integrally therewith, a flywheel 20 being suitably fastened to the flange 18 as by bolting.

Engine block 12 is fashioned with a conventional slinger groove 22 which cooperates with a slinger ring 24 in the well known manner. Block 12 also includes a tapering groove 26 which is adapted to receive and position an annular oil seal 28. As will become apparent, oil seal 28 effectively prevents lubricant from escaping the engine block 12.

Turning now to FIG. 6 for a more detailed description of oil seal 28, a cylindrical rib 30 is shown provided with a rectangular sealing bead 32. Support means defined by side members 34 and 36 are secured to the lateral edges of rib 30. Since rib 30 is desirably fashioned from a resilient, oil-resistant material, such as neoprene rubber, side members 34 and 36 may be secured to the rib 30 as by being molded integrally therewith. Bead 32 may be affixed in similar manner.

While rib 30 is shown as having hemispherical cross-section, it is recognized that other shapes may be equally well employed. Likewise, the showing of bead 32 as having rectangular cross-section is not intended to limit the shape of that element thereby as bead 32 may also take a number of shapes according to the dictates of specific situations.

An important feature of the invention resides in securing the side members 34 and 36 exclusively to the lateral edges of rib 30. So arranged, the top surface 38 of rib 30 is not restricted nor confined by any attached elements. Thus, rib 30 is susceptible of free radial flexure and, accordingly, implements a uniform, effective seal on the shaft 14.

The outer surface 40 of side member 34 and the outer surface 42 of side member 36 are conveniently tapered from the rib or bottom portion 44 to the top portion 46 in order to lead the oil seal 28 into wedged engagement with the tapered groove 26. Side members 34 and 36 are additionally convergible at the top portion 46. Accordingly, oil seal 28 may be positioned positively in the groove 26 to be non-rotatable with crankshaft 14.

In order to provide the desired rigidity and dimensional stability, side members 34 and 36 are preferably fabricated with reinforcing members 48 and 50. As best shown in FIG. 3, these reinforcing members may be formed into an elongated box-like unit. Members 48 and 50 may be fashioned from a suitable material, such as sheet steel and may be provided with strengthening beads 52 and rubber-bonding perforations 54. In addition, reinforcing members 48 and 50 are appropriately curved to coincide with the requisite curvilinear nature of oil seal 28. Furthermore, it is recognized that members 48 and 50 may be joined together at one or both ends by some suitable means, such as by end plates 56; or they may take the form of two separate, individual members.

Although oil seal 28 may be a continuous, annular article or an annular article cut once to facilitate its assembly to a shaft, seal 28 is preferably comprised of two segments, segments 28a and 28b, as best shown in FIG. 2. So comprised, oil seal 28 may be readily assembled about the crankshaft 14 in the groove 26.

When seal 28 is comprised of segments 28a and 28b, it is important to create a liquid-tight seal between confronting portions, such as end faces 60a and 60b. Accordingly, face 60b may be fashioned with a notch or undercut 62, whereas face 60a may be fashioned with a lip or tang 64. Tang 64 is preferably adapted to display a longitudinally outward taper greater than the longitudinally inward taper of notch 62. Thus, when face 60a engages face 60b, as when the two come together in assembly about the crankshaft 14, tang 64 will overlap notch 62. Furthermore, shaft 14 is directed to rotate in the general direction of arrow 66, according to the showing in FIG. 5, whereby rotation of the shaft 14 provides a wiping action urging tang 64 to overlap notch 62.

In one specific embodiment, it has proved advantageous to taper the tang 64 longitudinally outwardly approximately 13°. In the same embodiment, notch 62 has been tapered longitudinally inwardly approximately 7° so as to insure proper cooperation between the elements.

Operation of the oil seal of the invention will be readily apparent from the above descriptions.

While particular embodiments of the invention have been shown, it will be understood, of course, that the invention is not limited thereto since many modifications may be made; and it is, therefore, contemplated to cover by the appended claims any such modifications as fall within the true spirit and scope of the invention.

The invention is claimed as follows:

1. A segmented oil seal for a rotating shaft comprising: a plurality of rigid, arcuate reinforcing members adapted to be arranged defining a circle, each of said members including generally parallel, elongated side panels interconnected by end panels at the end edges thereof and defining free space between the remaining edges; and elastomeric means enveloping each of said reinforcing members to form a trough-like seal segment, said elastomeric means bridging the free space between the bottom edges of each of said members to form a radially flexible sealing rib.

2. A segmented oil seal according to claim 1 wherein each of said ribs is longitudinally tapered outwardly from the trailing end face of its corresponding segment and wherein each of said ribs is longitudinally tapered inwardly to a lesser degree from the leading end face of its segment whereby said ribs may be joined together around said shaft with the outward taper of one rib engaging the inward taper of the adjacent rib whereby rotation of said shaft incurs a liquid-tight seal between the ends of said ribs.

3. A segmented oil seal according to claim 2 wherein the outward taper is at an angle of 13° and wherein the inward taper is at an angle of 7° from the corresponding, radially extending end face.

4. A segmented oil seal for a rotating shaft adapted for fixing in the groove of a groove-defining means encompassing said shaft, said seal comprising: a plurality of rigid, arcuate reinforcing members adapted to be arranged defining a circle, each of said members including generally parallel, elongated side panels interconnected by end panels at the end edges thereof and defining free space between the remaining edges, said side panels being convergible inwardly from the bottom to the top whereby resiliently to engage the sidewalls of said groove; and elastomeric means enveloping each of said reinforcing members to form a trough-like seal segment, said elastomeric means bridging the free space between the bottom edges of each of said members to form a radially flexible sealing rib.

5. A segmented oil seal according to claim 1 and further comprising a rectangular bead extending radially from each of said sealing ribs for resiliently contacting said shaft.

References Cited in the file of this patent

UNITED STATES PATENTS

| | | |
|---|---|---|
| 1,359,170 | Hatfield | Nov. 16, 1920 |
| 1,622,911 | Huth | Mar. 29, 1927 |
| 1,835,127 | Willi | Dec. 8, 1931 |
| 2,647,002 | Brummer | July 28, 1933 |
| 2,704,683 | Shorna | Mar. 22, 1955 |
| 2,719,743 | Brummer et al. | Oct. 4, 1955 |
| 2,729,482 | Kosatka | Jan. 3, 1956 |